United States Patent
Hennequin et al.

(10) Patent No.: US 9,305,457 B2
(45) Date of Patent: Apr. 5, 2016

(54) SYSTEM FOR MANAGING A CABIN ENVIRONMENT IN A PLATFORM, AND ASSOCIATED MANAGEMENT METHOD

(71) Applicant: DASSAULT AVIATION, Paris (FR)

(72) Inventors: Arnaud Hennequin, Suresnes (FR); Hugues Abrassart, Saint Cloud (FR)

(73) Assignee: DASSAULT AVIATION, Paris (FR)

(*) Notice: Subject to any disclaimer, the term of this patent is extended or adjusted under 35 U.S.C. 154(b) by 0 days.

(21) Appl. No.: 14/155,194

(22) Filed: Jan. 14, 2014

(65) Prior Publication Data
US 2015/0017915 A1    Jan. 15, 2015

(30) Foreign Application Priority Data
Jul. 15, 2013  (FR) ..................... 13 01665

(51) Int. Cl.
*H04W 4/00* (2009.01)
*G08C 17/02* (2006.01)
*H04B 1/3822* (2015.01)
*H04B 7/185* (2006.01)
*H04N 21/214* (2011.01)

(52) U.S. Cl.
CPC .............. *G08C 17/02* (2013.01); *H04B 1/3822* (2013.01); *H04B 7/18506* (2013.01); *H04W 4/008* (2013.01); *H04N 21/214* (2013.01)

(58) Field of Classification Search
CPC .......... H04W 4/00; H04W 4/008; H04B 1/00; H04B 1/3822; H04B 1/3888; G06C 17/00; G08C 17/02

USPC ............ 455/418, 419, 420, 456.1, 457, 41.1, 455/41.2, 41.3, 67.11
See application file for complete search history.

(56) References Cited

U.S. PATENT DOCUMENTS

| | | | |
|---|---|---|---|
| 2010/0224727 A1 | 9/2010 | Bauer et al. | |
| 2012/0052852 A1* | 3/2012 | Goldman | 455/418 |
| 2012/0280784 A1* | 11/2012 | Gaviria Velez et al. | 455/41.1 |
| 2012/0329441 A1* | 12/2012 | Tseng | 455/457 |
| 2014/0099916 A1* | 4/2014 | Mallikarjunan et al. | 455/418 |

FOREIGN PATENT DOCUMENTS

WO    WO2012/162381    11/2012

* cited by examiner

*Primary Examiner* — Thanh Le
(74) *Attorney, Agent, or Firm* — Davidson, Davidson & Kappel, LLC (57) ABSTRACT

The system according to the invention comprises a mobile electronic device, at least one local base, arranged near a predefined location in the cabin, an assembly for pairing the mobile electronic device with the local base, and at least one piece of functional equipment for managing the cabin environment. The memory of the mobile electronic device stores at least one software application for controlling the functional equipment. The pairing system is capable of sending the mobile electronic device at least one location identification data of the local base during pairing between the mobile electronic device and the local base, the mobile electronic device being able to configure the control software application, based on the location identification data.

17 Claims, 5 Drawing Sheets

SYSTEM FOR MANAGING A CABIN ENVIRONMENT IN A PLATFORM, AND ASSOCIATED MANAGEMENT METHOD

CROSS-REFERENCE TO RELATED APPLICATIONS

This application claims benefit of French patent application number FR13 01665, filed Jul. 15, 2013, which is herein incorporated by reference.

BACKGROUND OF THE INVENTION

1. Field of the Invention

The present invention relates to a system for managing the cabin environment in a platform, the system comprising:
- a mobile electronic device including a memory and a user interface;
- at least one local base, arranged near a predefined location in the cabin;
- a system for pairing the mobile electronic device with the local base; and
- at least one piece of functional equipment for managing the cabin environment.

Such a system is designed to be implemented for example in an aircraft cabin, to allow an occupant of the cabin to control and customize the use of functional equipment in the cabin.

The functional equipment is for example a lighting device, an audio and/or video data retrieval device, an air-conditioning device, a device for covering a porthole, a device for communicating with the inside or outside of the aircraft and/or an outside viewing device.

2. Description of the Related Art

Modern aircrafts are equipped with many pieces of functional equipment making it possible to modify the cabin environment, to allow an occupant of the aircraft to have the necessary comfort during a flight.

In particular, the occupant of the aircraft generally wishes to travel in a temperature-controlled atmosphere, with brightness control based on the time or light phase.

The occupant of the aircraft also generally wishes to have pastimes on the ground or during the flight, for example listening to music, watching videos, communicating with the outside or observing the environment outside the aircraft using cameras.

To manage his environment, the occupant of the aircraft generally has one or more user interfaces on or near his seat that allow him to control the functional equipment.

These interfaces may assume the form of physical control buttons, for example positioned on armrests, or screen interfaces, for example positioned in the back of the seats located in front of the occupant.

In certain cases, the occupant of the aircraft wishes for his adjustment preferences for the functional equipment to be predetermined and customized, so that he can easily regain the desired environment in the aircraft.

To that end, document WO 2012/162381 describes a management system, in which the occupant of the aircraft uses an interface to define his adjustment preferences beforehand for the audio and/or video retrieval device.

Then, a processing unit present within the system creates a two-dimensional barcode encoding information representing the adjustment preferences, which is printed or downloaded on a portable device.

When the occupant is installed in the aircraft, he passes the barcode over a reader present in the audio and/or video retrieval device. A processing unit of the retrieval device decodes the representative information and controls the retrieval device accordingly.

Such a system has the advantage of adapting to the occupant of the aircraft. It is, however, tedious to implement and remains relatively unsuitable for controlling other functional equipment.

SUMMARY OF THE INVENTION

One aim of the invention is therefore to obtain a system for managing an environment in an aircraft cabin that adapts easily to the preferences of an occupant of the cabin, while being easy to implement and easily adaptable to a wide variety of functional equipment.

To that end, the invention relates to a system of the aforementioned type, characterized in that the memory of the mobile electronic device stores at least one software application for controlling the functional equipment, the pairing system being capable of sending the mobile electronic device at least one location identification data of the local base during pairing between the mobile electronic device and the local base, the mobile electronic device being able to configure the control software application, based on the location identification data.

The system according to the invention may comprise one or more of the following features, considered alone or according to any technically possible combination:
- the pairing assembly includes:
  - a transmission component borne by the local base, capable of transmitting a wireless signal bearing the location identification data,
  - a receiving component for receiving the location identification data borne by the mobile electronic device,
  - the pairing assembly being capable of automatically establishing a local wireless link between the transmission component and the receiving component by bringing the transmission component and the receiving component closer together to transmit the wireless signal bearing the location identification data;
- the local wireless link is a near-field communication link;
- the pairing assembly includes a device for displaying an encoding label for the location identification data, borne by the local base, and an optical component for reading the encoding label, borne by the mobile electronic device;
- the encoding label is a two-dimensional barcode;
- it includes multiple local bases, each local base being associated with a selected location in the cabin;
- the cabin includes multiple seats, the system including, for each seat, a local base associated with the seat, positioned on or near the seat;
- it includes a data transmission link capable of connecting the mobile electronic device to each piece of functional equipment to control the functional equipment from the mobile electronic device using the control software application;
- the pairing device is capable of sending the mobile electronic device configuration data for the data transmission link, from the local base, the mobile electronic device advantageously being able to establish the data transmission link automatically during pairing between the mobile electronic device and the local base, based on the configuration data of the data transmission link;

the data transmission link includes a central communication network, and a wireless link between the mobile electronic device and the central communication network;

the memory of the mobile electronic device stores user preference data, the control software application being able to control the functional equipment based on at least one user preference data stored in the memory;

at least one control software application is capable of controlling the functional equipment without user intervention, during pairing between the mobile electronic device and the local base;

at least one control software application is capable of controlling the functional equipment, based on a control instruction transmitted by the user using the user interface of the mobile electronic device;

the cabin includes at least one first compartment and at least one second compartment, the system comprising at least one first local base positioned in the first compartment and at least one second local base positioned in the second compartment, the control software application being capable of automatically controlling the functional equipment in the first compartment when the mobile electronic device and the first local base have been paired, without automatically controlling the functional equipment in the second compartment, the control software application being capable of automatically controlling the functional equipment in the second compartment when the mobile electronic device and the second local base have been paired, without automatically controlling the functional equipment in the first compartment.

The invention also relates to a method for managing a cabin environment in a platform, the method including the following steps:

providing a system as described above;

pairing the mobile electronic device with the local base using the pairing assembly;

transmitting at least one location identification data associated with the local base;

configuring at least one control software application, based on the transmitted location identification data; and implementing the control software application to control functional equipment.

BRIEF DESCRIPTION OF THE DRAWINGS

FIG. 2 shows a module for defining an emergency route in an embodiment of the invention.

FIG. 5 shows a 3D zone of displacement of an aerial vehicle comprising convex zones and the beacon points defined for the emergency route.

DETAILED DESCRIPTION

The first platform 10 is advantageously an aircraft, in particular a civilian airplane designed to carry passengers. Alternatively, the platform is a land-based vehicle, such as a railway or motor vehicle, or a naval vehicle.

Figure 2:
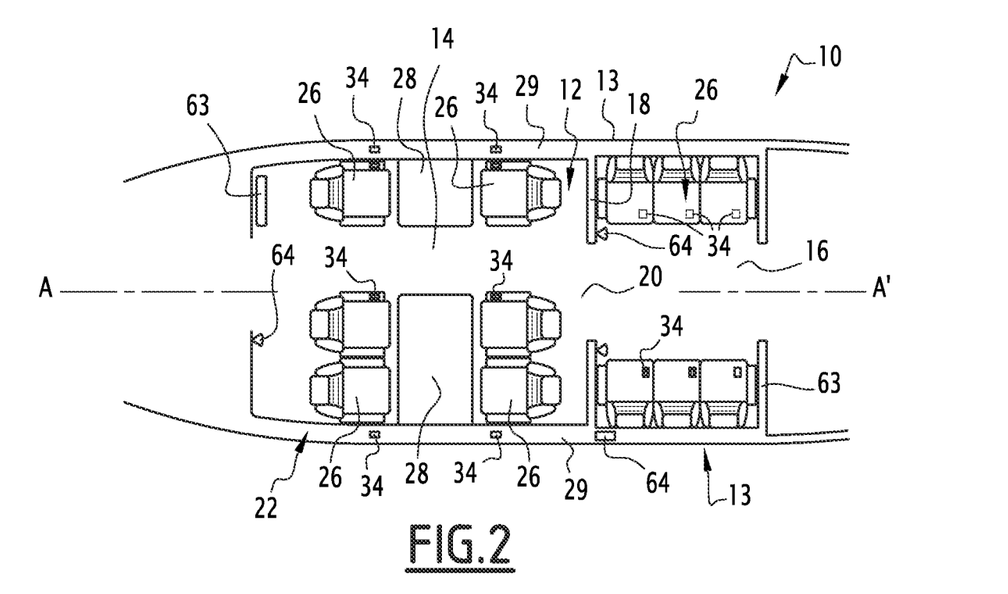
FIG. 2 is a diagrammatic top view, illustrating the aircraft cabin provided with multiple local bases associated with selected locations in the cabin.

As illustrated by FIG. 2, the platform 10 includes a cabin 12, designed to house at least one occupant of the platform 10, in particular a passenger of the platform 10.

The cabin 12 includes an outer wall 13 that defines multiple compartments 14, 16, preferably separated from each other by at least one partition 18.

A circulation passageway 20 is formed between the compartments 14, 16 to allow the passage of an occupant from one compartment 14, 16 to another compartment 16, 14.

In the example shown in FIG. 2, the cabin 12 defines a front compartment 14 and a rear compartment 16, in the normal direction of circulation of the platform 10, along a longitudinal axis A-A'.

Figure 1:
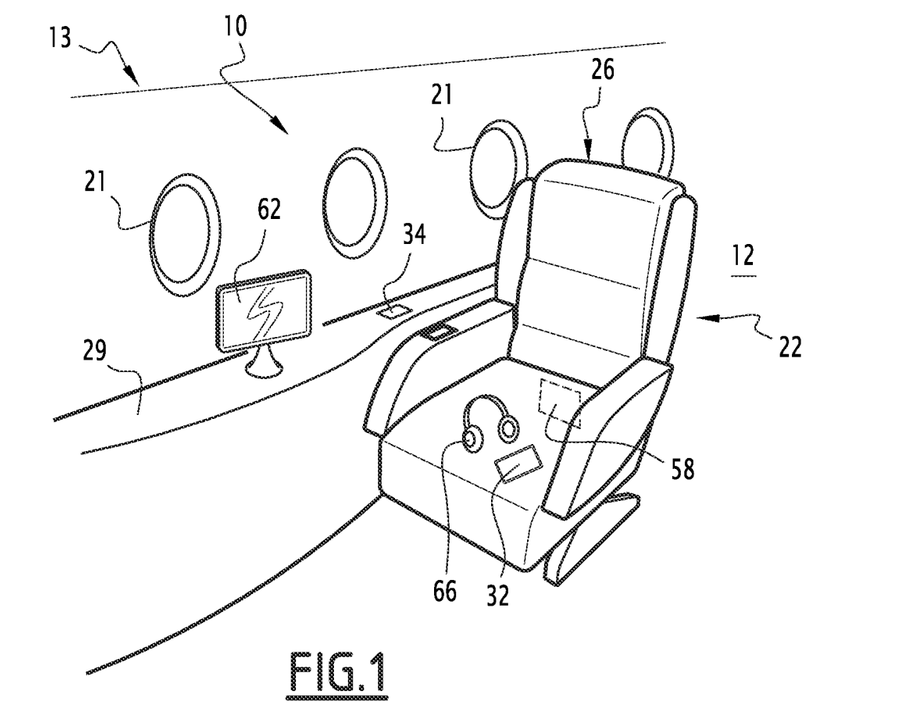
FIG. 1 is a partial diagrammatic perspective view of the local environment of an occupant of an aircraft cabin comprising multiple pieces of functional equipment and a management system according to the invention.

Furthermore, as illustrated by FIG. 1, the outer wall 13 delimits portholes 21 making it possible to observe the environment outside the cabin 12.

Figure 3:
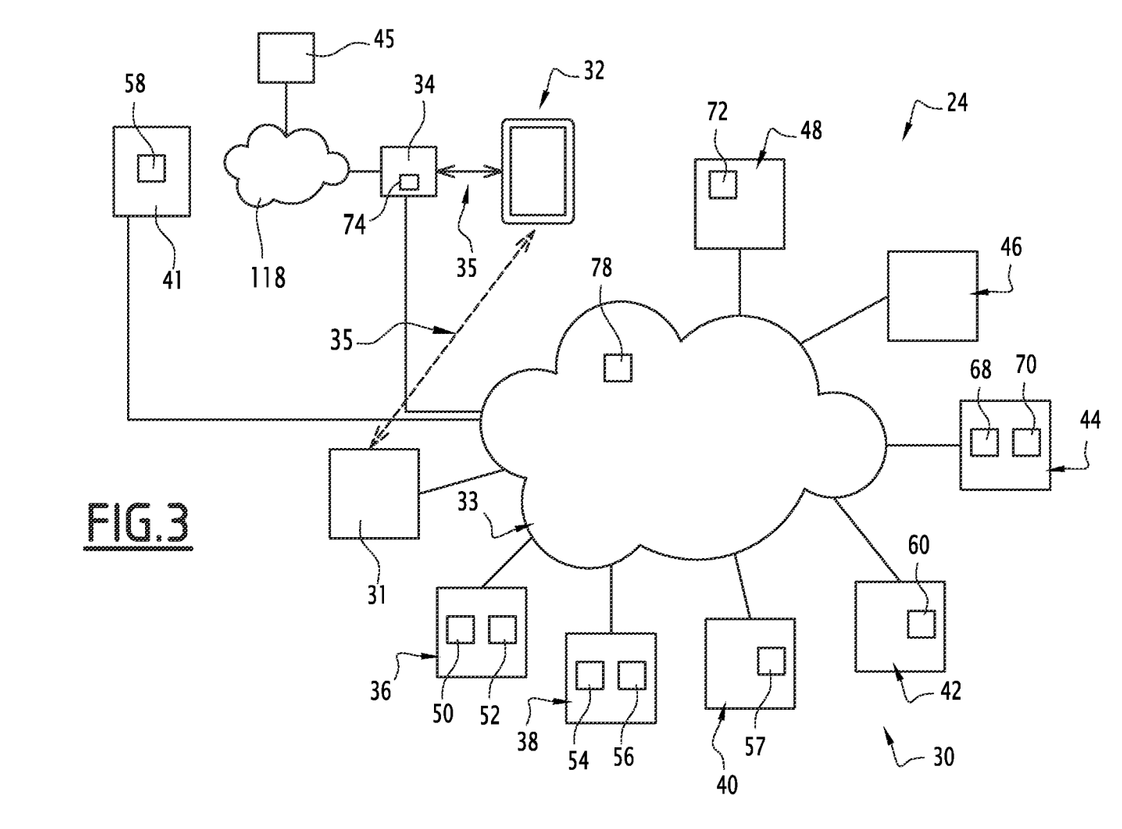
FIG. 3 is a functional diagram illustrating the structure of the management system according to the invention.

The platform 10 further includes furniture 22, placed in the cabin 12 for occupant comfort, and a system 24 according to the invention for managing a cabin environment, shown diagrammatically in FIG. 3.

In this example, the furniture 22 includes multiple seats 26 distributed in the compartments 14, 16 of the cabin 12. Each seat 26 is designed to receive one or more occupants of the cabin 12.

In this example, the furniture 22 further includes tables 28 and side supports 29.

In reference to FIG. 3, the system 24 for managing a cabin environment includes a set of functional equipment 30 for managing the cabin environment, which can be controlled by an occupant of the cabin 12. It advantageously includes a communication network 33 between the functional equipment 30 and a control unit 31 designed to be actuated by the crew of the aircraft.

The management system 24 further includes at least one mobile electronic device 32, designed to control the functional equipment 30, and multiple local bases 34 (only one of which is shown in FIG. 3) designed to be paired with a mobile electronic device 32, each local base 34 being associated with a predefined location in the cabin 12, in particular with a given seat 26 in the cabin 12. Advantageously, the control unit 31 also forms a base designed to be paired with a mobile electronic device 32.

According to the invention, the management system 24 further includes a pairing assembly 35 for pairing the mobile electronic device 32 with each local base 31, 34, to send an identification data of the location of the local base 31, 34 to the mobile electronic device 32.

The functional equipment 30 is designed to modify and monitor the cabin environment, locally or over the entire cabin 12, so as to contribute to the comfort of the occupant of the cabin 12.

The cabin environment in particular refers to an atmosphere of the cabin (temperature, brightness, etc.), or to the sound and/or image perceived by the occupant of the cabin (music, video, outside view, etc.).

The management system 24 therefore groups together the functionalities associated with a cabin management system capable of controlling the atmosphere of the cabin and an in-flight entertainment system capable of controlling the sound and/or image perceived by the occupant of the cabin.

To that end, the functional equipment 30 for example comprises equipment 36 for controlling the cabin temperature, equipment 38 for controlling the cabin lighting, equipment 40 for controlling the closing of the portholes 21, and/or motorized equipment 41 for modifying the configuration of each seat.

For passenger convenience, the functional equipment 30 for example comprises equipment 42 for retrieving audio and/or video and/or games, equipment 44 for viewing the outside using a camera, and/or equipment 45 for retrieving individual audio associated with each seat 26.

The functional equipment 30 advantageously includes equipment 46 for outside communication, for example by telephony, and equipment 48 for inside communication, allowing communication between the crew of the platform 10 and the occupants of the cabin 12.

The cabin temperature control equipment 36 preferably includes local units 50, 52 for adjusting the temperature in each compartment 14, 16. These units 50, 52 can be controlled selectively or jointly to adjust the temperature in each compartment 14, 16 individually.

The control equipment 38 for controlling the lighting also includes local units 54, 56 for adjusting the brightness, and advantageously the color of the lighting in each compartment 14, 16. These units 54, 56 can be controlled selectively or jointly to adjust the brightness and the color of the lighting individually in each compartment 14, 16.

For each porthole 21, the control equipment 40 for closing the portholes 21 includes a control unit 57 for closing the porthole 21. This control unit for example includes a covering flap, and a mechanism for moving the covering flap. Alternatively, the control unit 57 includes an electrical device for closing the porthole (for example a curtain) and/or an electrochromic device for closing the porthole.

The control units 57 for the portholes 21 can be controlled selectively or jointly to close the portholes 21 in an individualized or collective manner.

The motorized equipment 41 for adjusting the configuration of the seat comprises a control unit 58 associated with each seat 26, to selectively modify the incline of the seat 26.

The equipment 42 for audio and/or video retrieval includes at least one central unit 60 for storing content, for example audio and/or video and/or games and/or electronic magazines and books, multiple screens 62, 63 (shown in FIG. 1 and FIG. 2), capable of displaying video content and/or a game, and multiple collective speakers 64, the screens 62, 63 and the speakers 64 being distributed in the compartments 14, 16 of the cabin.

Advantageously, the retrieval equipment 42 includes at least one screen 62 associated with each seat 26, and at least one collective screen 63 positioned in each compartment 14, 16.

In the example shown in the figures, the individual audio retrieval equipment 45 includes at least one headset 66 associated with each seat 26 and shown in FIG. 1. The headset 66 is a wired or wireless headset.

The outside viewing equipment 44 includes multiple cameras 68 for viewing outside the cabin, and a control unit 70, capable of selectively displaying the image created by a camera 68 on a screen 62.

The outside communication equipment 46 includes at least one mobile telephony base, in particular a GSM, UMTS or GPRS base or a satellite telephone base.

The inside communication equipment 48 includes an announcement device 72 allowing the crew of the aircraft to broadcast a sound and/or video message, and an individual call system 74 associated with each seat 26 to allow the occupant of the platform 10 to alert a crewmember.

The central communication network 33 connects the pieces of functional equipment 30 to each other. It is for example formed by a local wired network operating under standard IEEE 802.3 ("Ethernet" network).

The central network 33 advantageously includes at least one wireless connection base 78 allowing at least part of the functional equipment 30 to be connected to the network 33 by a short-range wireless connection, for example operating under the standard IEEE 802.11 (Wi-Fi), standard IEEE 802.15.1 (Zigbee), or standard IEEE 802.15.4.

Thus, a first group of pieces of functional equipment 30 is connected to the central network 33 by a wired connection, and a second group of pieces of functional equipment 30 is connected to the central network 33 by a wireless connection.

The control unit 31 is connected to each piece of functional equipment 30 by means of the central network 33. It can be operated by a crewmember of the platform 10 to control each of the pieces of equipment 30. In one advantageous example, the unit 31 is formed by a touchscreen tablet, advantageously positioned in a compartment of the platform 10.

Figure 9:
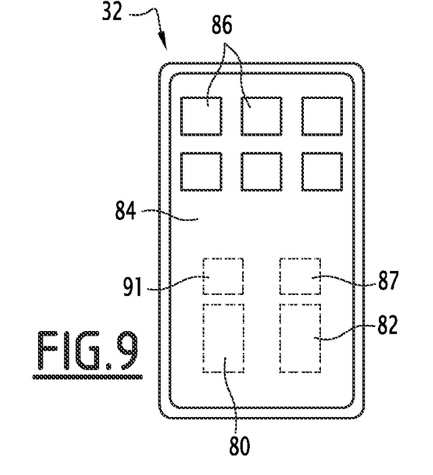
FIG. 9 illustrates a mobile electronic device having an interface provided with multiple icons for implementing control software applications for functional equipment.

In reference to FIG. 9, the mobile electronic device 32 is advantageously portable so that it can be grasped by an occupant of the platform 10. It is for example formed by a mobile telephone, preferably a smart phone.

Alternatively, the mobile electronic device 32 is formed by a tablet, such as a touchscreen tablet.

The mobile electronic device 32 includes a memory 80, capable of storing multiple software applications for controlling the equipment 30, and a processing and interface management unit 82, capable of running the software applications. It further includes a user interface 84, advantageously formed by a touchscreen.

The processing and interface management unit 82 can display, on the user interface 84, a base window including icons 86 for running control software applications, and, upon activation of each icon 86, a control window 90 for the control software application.

The mobile electronic device 32 further includes a system 87 for wireless connection to the central network 33, and advantageously a wireless telephony system 91.

For each control software application, the memory 80 is capable of storing user preference data, associated with the functional equipment 30 controlled by the control software application.

Each control software application stored in the memory 80 is capable of controlling at least one piece of equipment 30, based on the selected location identification data received from the pairing assembly 35 and the user preference data.

Thus, each control software application is capable of allowing selective control of the piece of equipment 30 based on the position of the local base 34 interacting with the mobile electronic device 32 in the cabin 12 of the platform 10.

In particular, each control software application is capable of allowing the selective control of the equipment 30 based on the compartment 14, 16 in which local base 31, 34 paired with the mobile electronic device 32 is located.

Thus, according to the invention, after the pairing of the mobile electronic device 32 with a local base 34, the control software application is configured to automatically execute a command with respect to the equipment 30, which applies only in the compartment 14, 16 in which the local base 34 is located, or exclusively in the vicinity of the seat 26 or on the seat 26 associated with the local base 34. This command is executed based on the user preference data stored in the memory 80.

The control unit 31 is furthermore capable of pairing with a mobile electronic device 32 of a crewmember, in particular a pilot, to send local positioning information for the crewmember near the unit 31, generally positioned in a galley.

The crewmember's portable electronic device 32 is then capable of executing software applications offering control rights different from those of the passengers of the aircraft.

Furthermore, each control software application stored in the memory 80 is advantageously capable of controlling the equipment 30 through manual entry by the user done on the user interface 84 of the mobile electronic device 32.

In that case, each control software application is advantageously implemented by selecting an icon 86 associated with that application on the user interface 84, to show a specific control window 90 associated with the control of the equipment 36 to 48.

Preferably, the control window 90 includes at least one button 92 for executing the command, and at least one button 94 for manually locating the specific location where the command must be executed, which may be activated by a user to define the location where the command must be executed.

As an example, each control window 90 includes a first button 96 for executing the command exclusively in a front compartment 14 of the cabin 12, a second button 98 for executing the command exclusively in a rear compartment 16 of the cabin 12, and preferably, a button 100 for executing the command in the entire cabin 12.

In the example shown in the figures, a control software application can for example automatically command the temperature control equipment 36, based on the location identification data sent from the local base 34 to the mobile electronic device 32 and the temperature preference data stored in the memory 80.

Alternatively, this command is implemented based on a manual entry by the user done on the graphic interface 84.

Figure 10:
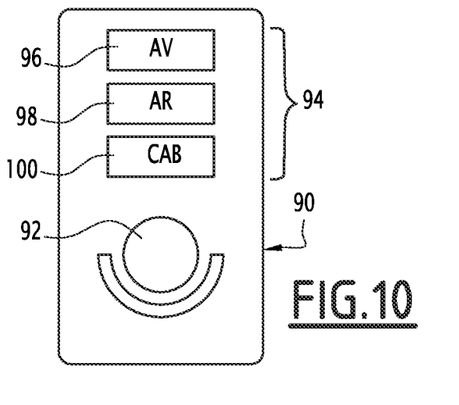
FIGS. 10 to 14 illustrate several control screens that may be displayed on the mobile electronic device during implementation of the control applications.

The control window 90 associated with the software application is illustrated in FIG. 10.

It includes at least one button 92 making it possible to adjust and command a desired temperature, and buttons 96 to 100, as previously described. The button 92 here is a graphic knob.

Another control software application stored in the memory 80 is for example able to automatically command the lighting control equipment 38, based on the location identification data sent from the local base 34 to the mobile electronic device 32 and the lighting preference data stored in the memory 80.

Alternatively, this command is implemented based on a manual entry by the user done on the user interface 84.

Figure 11:
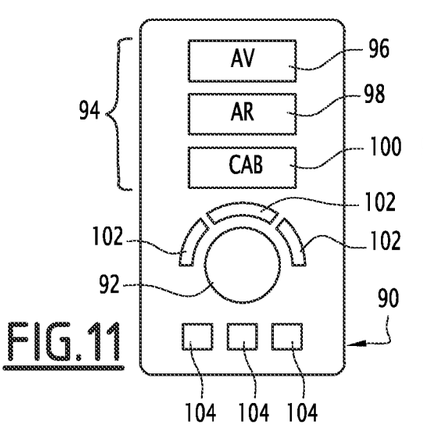

The control window 90 associated with the software application is illustrated in FIG. 11.

It includes at least one button 92 for activating the lighting, and buttons 102 for selecting the controlled lighting type, for example ceiling lighting or side lighting.

The control window 90 can also include buttons 104 for selecting the desired color of the lighting, or a test pattern, in addition to the previously described location buttons 96 to 100.

Another control software application stored in the memory 80 is for example capable of automatically commanding the control equipment 40 to close the portholes, based on the location identification data sent from the local base 34 to the mobile electronic device 32 and the closing preference data stored in the memory 80.

Alternatively, this command is implemented based on a manual entry by the user done on the user interface 84.

Figure 12:
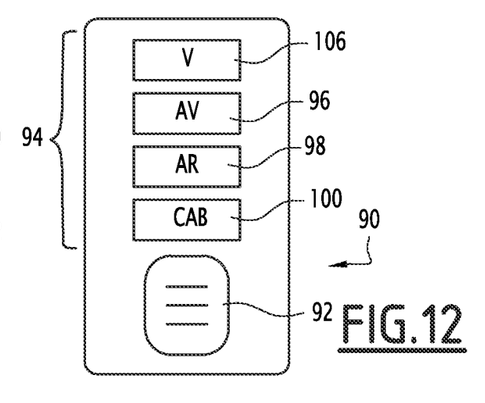

The control window 90 associated with the software application is illustrated by FIG. 12.

It includes a button 92 for adjusting the degree of closing of the porthole 21, which can be controlled manually. In addition to the previously described buttons 96 to 100, at least one button 106 is capable of controlling the adjustment of the porthole(s) 21 situated directly in the vicinity of the seat 26 associated with the local base 34 paired with the mobile electronic device 32.

Another control software application stored in the memory 80 is for example capable of automatically commanding the audio and/or video retrieval equipment 42, based on the location identification data sent from the local base 34 to the mobile electronic device 32 and audio and/or video and/or game and/or magazine and/or book preference data stored in the memory 80.

These data for example comprise preferred lists of audio and/or video and/or game files.

Alternatively, this command is implemented manually based on an entry by the user done on the graphic interface 84.

Figure 13:
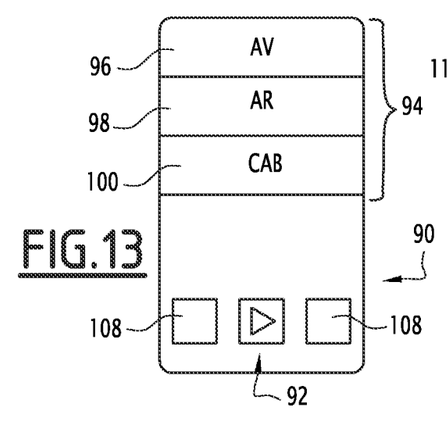

The control button 90 associated with this software application is illustrated by FIG. 13.

As before, the window 90 includes the buttons 96 to 100 allowing the audio and/or video and/or game and/or magazine and/or book retrieval, in the front compartment 14, in the rear compartment 98, and in the entire cabin 12, respectively.

The window 90 further includes an execution button 92 making it possible to play and/or pause an audio and/or video and/or game retrieval and optionally other execution buttons 108 for example allowing a rapid forward or backward movement, or the passage to another audio and/or video and/or game and/or magazine and/or book file.

Another control software application stored in the memory 80 is for example capable of automatically controlling the outside viewing equipment 44, based on the location identification data sent from the local base 34 to the mobile electronic device 32 and outside viewing preference data stored in the memory 80.

These data for example comprise the choice of a preferred outside viewing camera.

Alternatively, this command is implemented manually based on an entry by the user done on the graphic interface 84.

Figure 14:
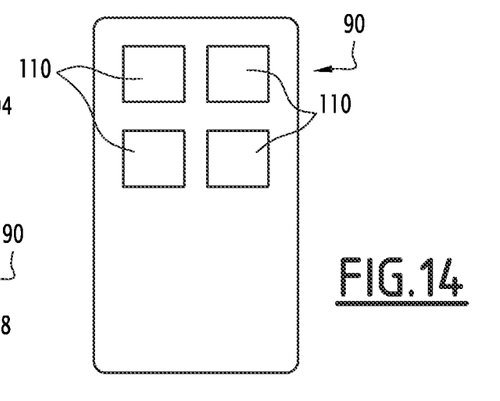

The control window 90 associated with this software application is illustrated in FIG. 14.

This window does not have buttons 96 to 100. It is, however, provided with icons 110 allowing the selective activation and the display on the screen 62 of an outside viewing camera selected from among all of the outside viewing cameras.

Another control software application stored in the memory 80 is for example capable of allowing identification with the equipment and commanding the individual audio and/or video retrieval equipment 45, based on the location identification data sent from the local base 34 to the mobile electronic device 32, to connect the individual audio and/or video retrieval equipment 45 to the base 34 and/or to the central network 33 by a wired or wireless link 118, for example operating under standard IEEE 802.11 (Wi-Fi), standard IEEE 802.15.1 (Zigbee) or standard IEEE 802.15.4.

Another control software application stored in the memory 80 is for example capable of automatically commanding the outside communication equipment 46, based on the location identification data sent from the local base 34 to the mobile electronic device 32 and telephony preference data stored in the memory 80.

This application is for example capable of automatically connecting the mobile electronic device 32, in particular the wireless telephony equipment 91, to the mobile telephony base.

Another command software application stored in the memory 80 is capable of creating an alert for the crew on the unit 31 based on the selected location identification data received from the pairing assembly 35.

The control software application may further be implemented manually by pressing a button displayed on the user interface 84, or by pressure code, such as a double pressure on the user interface 84.

In the embodiment illustrated by FIGS. 1 and 2, each local base 34 is connected to the central network 33, for example by a wired or wireless link.

In one example, each local base 34 is formed by a touchscreen interface fastened on a seat 26 or in the vicinity thereof, for example on a table 28 or a side support 29. Alternatively, at least one local base 34 is formed by a touchscreen tablet, fastened removably on the seat 26, or in the vicinity thereof.

Preferably, each local base 34 is associated with a particular seat 26, predefined in the cabin 12.

Figure 4:
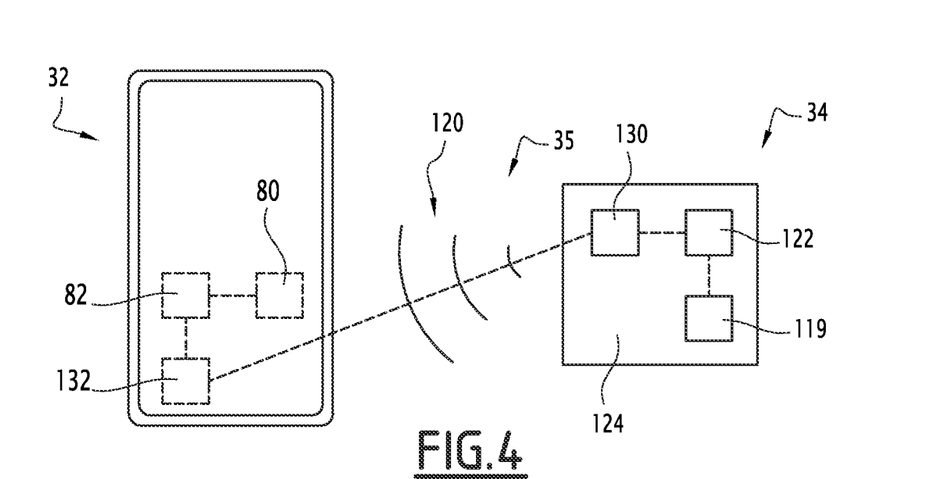
FIG. 4 is a diagrammatic view of the pairing assembly of the system of FIG. 3

As illustrated by FIG. 4, each base 34 includes a memory 120, capable of storing at least one location identification data associated with the base 34, a local processing unit 122 associated with the memory 120, and optionally a user interface 124.

The location identification data for example include the seat number 26, positioning information of the seat in the cabin 12, in particular, the compartment 14, 16 in which the seat 26 is located.

It may include identification information for platform 10, for example the type of platform 10 or the serial number of the platform 10.

Advantageously, the memory 120 also stores information relative to a wireless connection of the mobile electronic device 32 on the central network 33, such as a network identifier and/or a network key.

Figure 8:
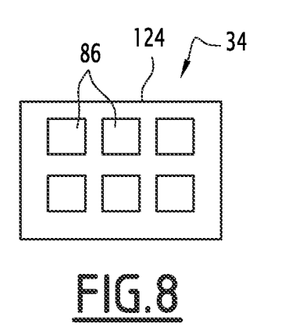

The user interface 124 preferably includes a touchscreen 126. As illustrated by FIG. 8, the touchscreen 126 can be activated by the user to display a window comprising icons 86 for running control applications of the equipment 30, similar to the icons 86 displayed on the mobile electronic device 32.

In the embodiment of FIG. 4, the pairing assembly 35 is capable of implementing a wireless link 120 of the "near field communication" (NFC) type.

Such a link is for example done according to standards ECMA-340 and ISO/IEC 18092.

This link is implemented from the local base 34 toward the mobile electronic device 32.

It is advantageously implemented automatically by simply bringing the mobile electronic device 32 and the base 34 closer together. It generally has a maximum range of less than 20 cm, and a standard usage range in particular comprised between 1 cm and 10 cm.

The transmission throughput is relatively limited, for example below 500 kbps.

The pairing assembly 35 thus includes a transmission component 130, sometimes called "initiator", borne by the base 34, and a receiving component 132, sometimes called "target", borne by the mobile electronic device 32.

Advantageously, the transmission component 130 is capable of creating an induction variable electromagnetic field, which is picked up by a coil of the receiving component 132. The frequency of the electromagnetic field is for example comprised between 5 MHz and 30 MHz.

The variable electromagnetic field forms a wireless signal carrying the location identification data.

In one embodiment, the transmission component 130 is formed by a chip storing the location identification data.

The receiving component 132 is capable of receiving the signal carrying the location identification data sent by the transmission component 130 through the link 120. This signal is next read by the processing unit 82 of the mobile electronic device 32 to extract the location identification data therefrom.

Figure 5:
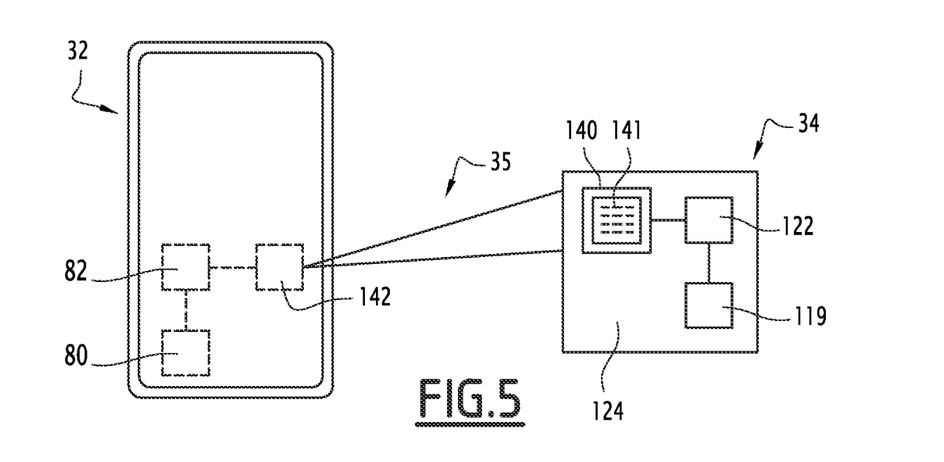
FIG. 5 is a view similar to FIG. 4 of an alternative or addition of a pairing assembly.
Figure 6:
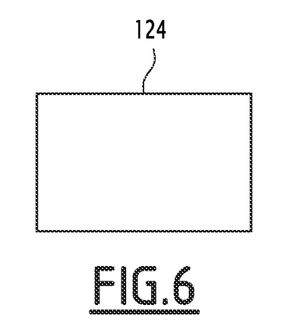
FIGS. 6 to 8 illustrate interface screens of a local base in different usage configurations.

In an alternative or addition shown in FIG. 5, the pairing assembly 26 includes a device 140 for displaying an encoding label, here a two-dimensional barcode, encoding the location identification data. The device 140 is borne by the base 34. The pairing assembly 26 comprises an optical component 142 capable of picking up a two-dimensional barcode image, the optical component 142 being borne by the mobile electronic device 32.

Figure 7:
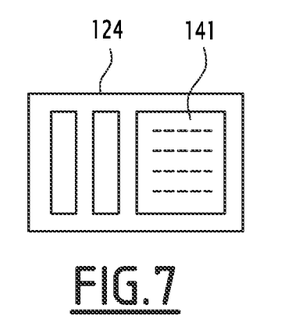

The display device 140 is capable of displaying the two-dimensional barcode, for example during activation of the interface 124 by the user, as illustrated by FIG. 7, and hiding that barcode in the absence of activation, or after a given time period.

Alternatively, the display device 140 displays the two-dimensional barcode 141 continuously.

The optical component 142 includes an optic capable of detecting the structure of the two-dimensional barcode 141.

According to the invention, the processing unit 82 of the mobile electronic device 32 includes a decoding software module, capable of retrieving the location identification data based on the structure of the two-dimensional barcode 141.

The processing unit 82 is capable of using these location identification data to automatically parameterize the control software applications of the equipment 30.

The operation of the management system 24 according to the invention will now be described.

Initially, the user parameterizes the memory 80 of the mobile electronic device 32 to define and store the user preference data.

These user preference data are for example a desired temperature, a desired lighting configuration, a desired closing configuration of the portholes 21, a desired seat configuration, a desired audio and/or video and/or game and/or magazine and/or book retrieval configuration, such as a preferred list of files, or a desired configuration of the outside viewing system.

Furthermore, the user loads the control software applications for the equipment 30 in the memory 80.

Then, when the user is in the cabin 12, he moves toward a selected location in the cabin 12, for example a seat 26.

He then places his mobile electronic device 32 near the local base 34 associated with the selected location.

In the case of a pairing assembly 35 working by wireless link, the user places the receiving component 132 facing the transmission component 130. The transmission component 130 automatically creates a variable electromagnetic field bearing the location identification data, which is sent to the receiving component 132. This transmission is advantageously done by a near-field communication link 120, as described above. The receiving component 132 creates an electric signal bearing the location identification data.

Alternatively or additionally, the user shows a two-dimensional barcode 141 on the display device 140 and scans the two-dimensional barcodes 141 using the optical component 142 to create an electric signal bearing the location identification data.

The processing unit 82 collects the electric signal, and processes it to extract the location identification data therefrom.

The unit 82 then automatically configures the control software applications of the equipment 30 based on the location identification data and advantageously, user preference data.

In particular, the processing unit 82 configures the wireless data link between the mobile electronic device 32 and the central network 33 to activate that link. It then also configures any wireless data links between the mobile electronic device 32 and the equipment 30, in particular between a mobile electronic device 32 and the motorized equipment 41 for controlling the configuration of the seat, and between the mobile electronic device 32 and the individual audio retrieval equipment 45.

When these links are established, the processing unit 82 can automatically run the control software applications to automatically control at least part of the equipment 30 based on location identification data transmitted by the pairing assembly 35, and based on user preference data stored in the memory 80.

The automatic control of the temperature management equipment 36 is then done to locally apply the desired temperature in the compartment 14, 16 in which the local base 34 has interacted with the mobile electronic device 32.

Likewise, the automatic command of the lighting control equipment 38 is done to apply the desired brightness locally in the compartment 14, 16 in which the local base 34 has interacted with the mobile electronic device 32.

The automatic command of the equipment for closing the portholes 40 can also be done, according to the desired closing preferences for the portholes defined by the user, in the compartment 14, 16 in which the local base 34 has interacted with the mobile electronic device 32.

Furthermore, the automatic command of the motorized equipment 41 for the seat 26 configuration is also done to adopt the seat incline configuration selected by the user.

If the user so wishes, a command of other pieces of equipment 30 may also be done automatically once the pairing is done.

The cabin environment management system 24 according to the invention is therefore particularly simple to implement, since it requires simply bringing a mobile electronic device 32 and a local base 31, 34 spatially closer together to perform pairing allowing location information data to be sent from the base 31, 34 to the mobile electronic device 32.

The processing unit 82 of the mobile electronic device 32 is then capable of automatically configuring each control software application of a piece of equipment 30, preferably without user intervention, and applying the user preferences to the configuration of the equipment 30 by default.

The user then has all necessary functionalities to manage his environment using his mobile electronic device 32.

The system 24 adapts easily to several different pieces of equipment 30. It is also easy to add additional equipment 30 to the system 24, and to control it using a new control software application, added in the memory 80 of the mobile electronic device 32.

Figure 15:
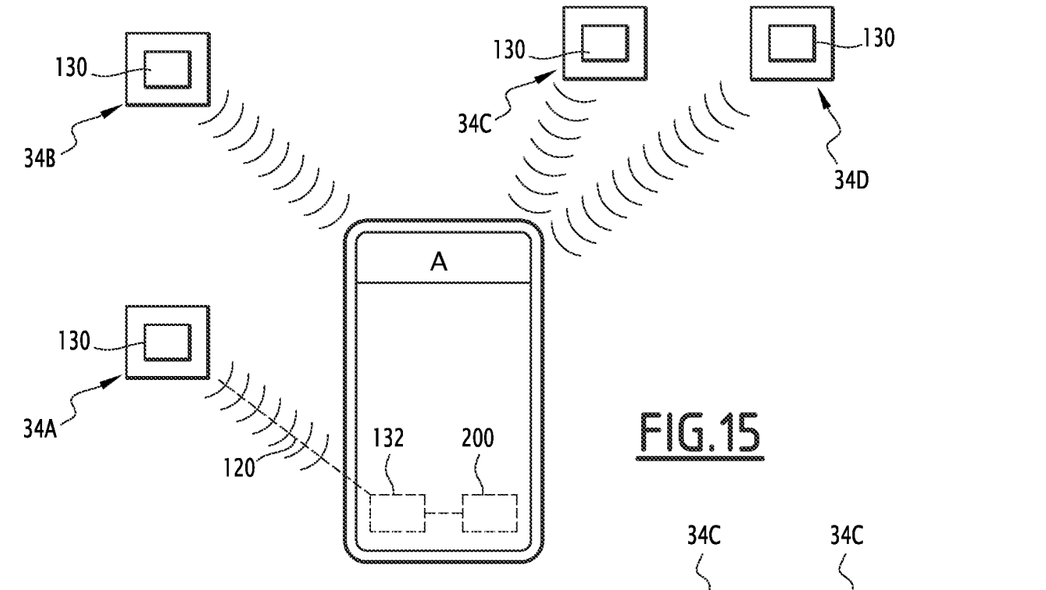
FIGS. 15 to 17 are views similar to FIG. 4 of a variation of a pairing assembly of the system of FIG. 3. A first transport platform 10 according to the invention is illustrated by FIGS. 1 and 2.
Figure 16:
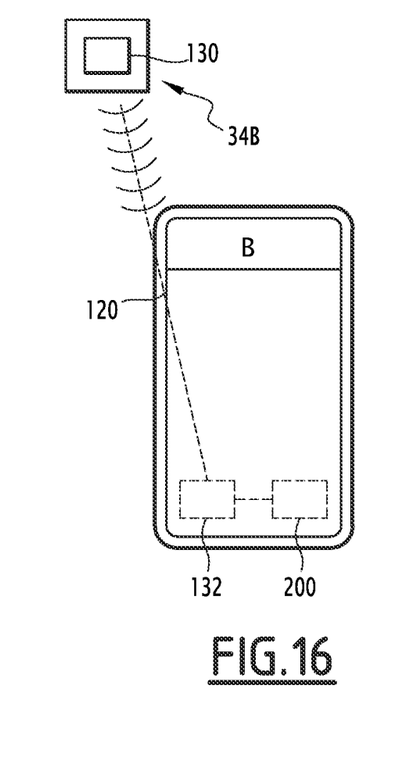
Figure 17:
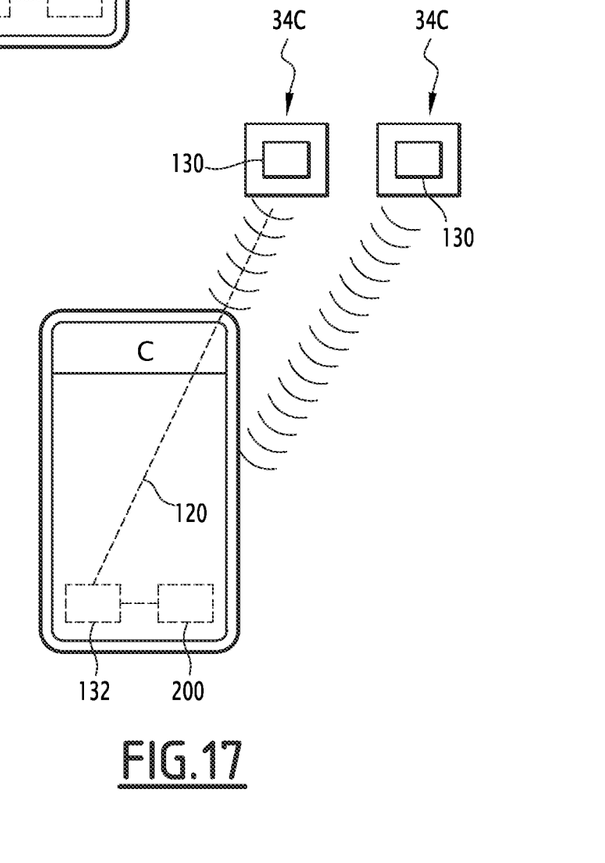

The embodiment of FIGS. 15 to 17 differs from the embodiment shown in FIG. 4 in that the pairing assembly 35 also comprises a positioning component 200, capable of determining the relative position of each transmission component 130 borne by each base 34 in order to find the transmission component 130 which is the closest from the mobile electronic device 32.

The positioning component 200 is carried by the mobile electronic device 32.

In an embodiment, the positioning component 200 is capable of analyzing the different radioelectric signals received by the receiving component 132, in particular their intensity and/or their original direction, to determine at least a data of relative positioning of the transmission component 130 relative to the receiving component 132. This data allows the identification of the transmission component 130 which is closest from the mobile electronic device 32, in any given position of the mobile electronic device 32.

Preferably, each transmission component 130 comprises, a transmitter capable of actively emitting, permanently or intermittently, a radioelectric signal bearing the location identification data. The radioelectric signal is for example transmitted according to the Low Energy Bluetooth protocol, at a frequency comprised in particular between 2 GHz and 3 GHz, for example at 2.4 GHz.

Each transmission component 130 is for example a component of the type iBeacon® of Apple.

The pairing assembly 35 is capable of establishing a wireless link 120 between the receiving component 132 and the transmission component 130 of each detected base 34. The signal bearing the location identification data of the base 34 is transmitted from each transmission component 130 towards the receiving component 132.

As described previously, the signal is then read by the processing unit 82 of the mobile electronic device 32 to extract the location identification data.

When the user moves along with the mobile electronic device 32, the pairing assembly 35 is capable, at each instant, of determining the transmission component 130 which is closest from the mobile electronic device 32 using the positioning component 200, and is capable of configuring the control software application, based on the location identification data associated with the particular base 34, as received by the wireless radioelectric link 120.

The operation of the managing system 24 is illustrated by FIGS. 15 to 17.

In this example, the system 24 comprises bases 34A to 34D, which are located in the cabin, for example in the vicinity of each seat 26.

When the user carrying the mobile electronic device 32 moves towards the aircraft, the receiving component 132 detects the radioelectric signal transmitted by the transmission component 130 of a base 34A, and potentially, other radioelectric signals transmitted by transmission components 130 of other terminals 34B to 34D.

The pairing assembly 35 generates a wireless link 120 between the transmission component 130 of each terminal 34A to 34B which has been detected and the receiving component 132.

As illustrated in FIG. 15, the positioning component 200 detects that the transmission component 130 of base 34A is the closest.

When the positioning component 200 determines that the mobile electronic device 32 is located at a distance smaller than a first threshold distance, for example 50 meters, from the closest base 34A, the processing and management unit 82 then advantageously displays on the user interface 84 a window comprising for example a message indicating the proximity of the aircraft.

Then, when the user handling the mobile electronic device 32 enters the aircraft, the user along with the mobile electronic device 32, moves closer to the closest base 34A beyond a second threshold distance, smaller than the first threshold distance, equal for example to 2 meters.

The processing and interface management unit 82 then advantageously displays on the user interface 84, a window comprising for example a welcome message into the aircraft.

Then, as illustrated in FIG. 16, when the user is placed near a base 34B which is located in the cabin, for example in the vicinity of a seat 26, the positioning component 200 detects that the transmission component 130 of the associated base 34B is now the closest. It also detects that the mobile electronic device 32 is located at a distance smaller than a third threshold distance, smaller than the second threshold distance, from the base 34B, for example lower than 50 cm.

The processing unit 82 extracts the location identification data received by the wireless link 120 associated with the base 34B and automatically configures at least one control software application, based on the location identification data transmitted from the base 34B.

The user is then capable of operating a control software application to control functional equipment 30.

When the user moves in the aircraft along with its mobile electronic device 32, and is moving closer from another base 34C, for example associated with another seat 26 of the aircraft, the detection component 200 detects that this base 34C is the closest and detects that the distance separating the device 32 from the base 34C is smaller than the third threshold distance. In that case, the mobile electronic device 32 reconfigures the control software application based on the location identification data associated with terminal 34C.

In this embodiment, the user does not need to specifically place the receiving component 132 in register with the transmission component 130 when it moves into the aircraft, the positioning component 200 being capable of automatically identifying the base 34 which is the closest in order for the pairing assembly 35 to configure the control software application as a function of the location identification data associated with this base 34.

The system 24, as disclosed in FIGS. 15 to 17, is therefore particularly simple to use.

The invention claimed is:

1. A system for managing a cabin environment in a platform, the system comprising:
    a mobile electronic device including a memory and a user interface;
    at least one local base, arranged near a predefined location in the cabin;
    an assembly for pairing the mobile electronic device with the local base;
    at least one piece of functional equipment for managing the cabin environment;
    the memory of the mobile electronic device storing at least one software application for controlling the functional equipment,
    the pairing system being capable of sending the mobile electronic device at least one location identification data of the local base during pairing between the mobile electronic device and the local base, the mobile electronic device being able to configure the control software application, based on the location identification data.

2. The system according to claim 1, wherein the pairing assembly includes:
    a transmission component borne by the local base, capable of transmitting a wireless signal bearing the location identification data,
    a receiving component for receiving the location identification data borne by the mobile electronic device,
    the pairing assembly being capable of automatically establishing a local wireless link between the transmission component and the receiving component by bringing the transmission component and the receiving component closer together to transmit the wireless signal bearing the location identification data.

3. The system according to claim 2, wherein the pairing assembly comprises a positioning component able to generate a data of relative positioning of the receiving component relative to the transmission component.

4. The system according to claim 2, wherein the local wireless link is a near-field communication link or a communication link having a radio-electric signal configured to be analyzed in intensity and/or original direction to determine at least a data of relative positioning of the transmission component relative to the receiving component.

5. The system according to claim 3, wherein the local wireless link is a near-field communication link or a communication link having a radio-electric signal configured to be analyzed in intensity and/or original direction to determine at least a data of relative positioning of the transmission component relative to the receiving component.

6. The system according claim 1, wherein the pairing assembly includes a device for displaying an encoding label for the location identification data, borne by the local base, and an optical component for reading the encoding label, borne by the mobile electronic device.

7. The system according to claim 6, wherein the encoding label is a two-dimensional barcode.

8. The system according to claim 1, including multiple local bases, each local base being associated with a selected location in the cabin.

9. The system according to claim 8, wherein the cabin includes multiple seats, the system including, for each seat, a local base associated with the seat, positioned on the seat or near the seat.

10. The system according to claim 1, including a data transmission link capable of connecting the mobile electronic device to each piece of functional equipment to control the functional equipment from the mobile electronic device using the control software application.

11. The system according to claim 10, wherein the pairing assembly is capable of sending the mobile electronic device configuration data for the data transmission link, from the local base, the mobile electronic device advantageously being able to establish the data transmission link automatically during pairing between the mobile electronic device and the local base, based on the configuration data of the data transmission link.

12. The system according to claim 10, wherein the data transmission link includes a central communication network, and a wireless link between the mobile electronic device and the central communication network.

13. The system according to claim 1, wherein the memory of the mobile electronic device stores user preference data, the control software application being able to control the functional equipment based on at least one user preference data stored in the memory.

14. The system according to claim 1, wherein at least one control software application is capable of controlling the functional equipment without user intervention, during pairing between the mobile electronic device and the local base.

15. The system according to claim 1, wherein at least one control software application is capable of controlling the functional equipment, based on a control instruction transmitted by the user using the user interface of the mobile electronic device.

16. The system according to claim 1, wherein the cabin includes at least one first compartment and at least one second compartment, the system comprising at least one first local base positioned in the first compartment and at least one second local base positioned in the second compartment, the control software application being capable of automatically controlling the functional equipment in the first compartment when the mobile electronic device and the first local base have been paired, without automatically controlling the functional equipment in the second compartment, the control software application being capable of automatically controlling the functional equipment in the second compartment when the mobile electronic device and the second local base have been paired, without automatically controlling the functional equipment in the first compartment.

17. A method for managing a cabin environment in a platform, the method including the following steps:

providing a system for managing a cabin environment in a platform, the system comprising:
- a mobile electronic device including a memory and a user interface;
- at least one local base, arranged near a predefined location in the cabin;
- an assembly for pairing the mobile electronic device with the local base;
- at least one piece of functional equipment for managing the cabin environment;
- the memory of the mobile electronic device storing at least one software application for controlling the functional equipment,
- the pairing system being capable of sending the mobile electronic device at least one location identification data of the local base during pairing between the mobile electronic device and the local base, the mobile electronic device being able to configure the control software application, based on the location identification data;

pairing the mobile electronic device with the local base using the pairing assembly;

transmitting at least one location identification data associated with the local base;

configuring at least one control software application, based on the transmitted location identification data;

implementing the control software application to control functional equipment.

* * * * *